US012785454B2

(12) United States Patent
Basak et al.

(10) Patent No.: US 12,785,454 B2
(45) Date of Patent: Nov. 3, 2026

(54) WIRELESS POWER TRANSMISSION APPARATUS WITH MULTIPLE PRIMARY COILS AND ADJACENT COIL MUTING

(71) Applicant: GE Intellectual Property Licensing, LLC, Niskayuna, NY (US)

(72) Inventors: Rupam Basak, Howrah (IN); Jayanti Ganesh, Bangalore (IN); Viswanathan Kanakasabai, Bangalore (IN); Suma Memana Narayana Bhat, Bangalore (IN); Subbarao Tatikonda, Bangalore (IN)

(73) Assignee: GE Intellectual Property Licensing, LLC, Niskayuna, NY (US)

( * ) Notice: Subject to any disclaimer, the term of this patent is extended or adjusted under 35 U.S.C. 154(b) by 0 days.

(21) Appl. No.: 17/612,805

(22) PCT Filed: May 20, 2020

(86) PCT No.: PCT/US2020/033782

§ 371 (c)(1),
(2) Date: Nov. 19, 2021

(87) PCT Pub. No.: WO2020/236922

PCT Pub. Date: Nov. 26, 2020

(65) Prior Publication Data

US 2022/0247229 A1 Aug. 4, 2022

(30) Foreign Application Priority Data

May 21, 2019 (IN) ............................. 201911020202

(51) Int. Cl.
*H02J 50/40* (2016.01)
*H02J 7/50* (2026.01)
(Continued)

(52) U.S. Cl.
CPC .............. *H02J 50/402* (2020.01); *H02J 7/50* (2026.01); *H02J 50/12* (2016.02); *H02J 50/80* (2016.02); *H02J 50/90* (2016.02)

(58) Field of Classification Search
None
See application file for complete search history.

(56) References Cited

U.S. PATENT DOCUMENTS 6,552,422 B1 4/2003 Schober
8,629,650 B2 1/2014 Mohammadian et al.
(Continued)

FOREIGN PATENT DOCUMENTS

AU 2018101451 11/2018
CN 107294224 10/2017
(Continued)

OTHER PUBLICATIONS

"PCT Application No. PCT/US2020/033782 International Search Report and Written Opinion", dated Sep. 15, 2020, 10 pages.
(Continued)

*Primary Examiner* — Daniel Kessie
(74) *Attorney, Agent, or Firm* — DeLizio, Peacock, Lewin & Guerra LLP

(57) ABSTRACT

This disclosure provides systems, devices, apparatus and methods, including computer programs encoded on storage media, for a wireless power transmission apparatus that supports charging of one or more wireless power receiving apparatuses. The wireless power transmission apparatus may include multiple primary coils organized in groups (referred to as zones). Each zone may have a local controller for managing operation of one primary coil in the zone at a time. A master controller may selectively couple the primary coils to the local controllers. When a first primary coil is coupled to the local controller for a zone, the other primary
(Continued)

coils in that zone may be disabled. The master controller may manage which primary coils from neighboring zones are coupled to their respective local controllers. Thus, when the first primary coil is activated, the adjacent primary coils (near the first primary coil) can be muted or disabled to mitigate undesirable interference.

24 Claims, 9 Drawing Sheets

(51) Int. Cl.

| | |
|---|---|
| ***H02J 50/12*** | (2016.01) |
| ***H02J 50/80*** | (2016.01) |
| ***H02J 50/90*** | (2016.01) |

(56) References Cited

U.S. PATENT DOCUMENTS

| | | | | |
|---|---|---|---|---|
| 8,629,654 | B2 | 1/2014 | Partovi et al. | |
| 8,965,720 | B2 | 2/2015 | Azancot et al. | |
| 9,112,363 | B2 | 8/2015 | Partovi | |
| 9,142,990 | B2 | 9/2015 | Keeling et al. | |
| 9,570,926 | B2 | 2/2017 | Madau et al. | |
| 9,590,447 | B2 | 3/2017 | Knepper | |
| 9,620,985 | B2 | 4/2017 | Rosenfeld | |
| 9,698,608 | B2 | 7/2017 | Keeling et al. | |
| 9,780,572 | B2 | 10/2017 | Standke et al. | |
| 9,893,553 | B2 | 2/2018 | Pudipeddi et al. | |
| 10,044,234 | B2 | 8/2018 | Muurinen et al. | |
| 11,374,431 | B2 | 6/2022 | Keith et al. | |
| 2007/0103025 | A1 | 5/2007 | Rohrer et al. | |
| 2007/0279002 | A1 | 12/2007 | Partovi | |
| 2009/0033280 | A1 | 2/2009 | Choi et al. | |
| 2009/0224723 | A1 | 9/2009 | Tanabe | |
| 2010/0259217 | A1 | 10/2010 | Baarman et al. | |
| 2010/0314946 | A1 | 12/2010 | Budde et al. | |
| 2013/0015705 | A1 | 1/2013 | Abe | |
| 2013/0015719 | A1* | 1/2013 | Jung | H02J 50/90 307/104 |
| 2015/0303699 | A1 | 10/2015 | Wagman et al. | |
| 2015/0318730 | A1* | 11/2015 | Bhargava | H02J 50/10 320/108 |
| 2016/0013661 | A1 | 1/2016 | Kurs et al. | |
| 2016/0056432 | A1 | 2/2016 | Searles | |
| 2016/0072299 | A1 | 3/2016 | Huang et al. | |
| 2016/0099578 | A1 | 4/2016 | Hwang | |
| 2016/0308394 | A1 | 10/2016 | Abdolkhani et al. | |
| 2017/0085116 | A1 | 3/2017 | Tsao | |
| 2017/0095667 | A1 | 4/2017 | Yakovlev et al. | |
| 2017/0317536 | A1 | 11/2017 | Marson et al. | |
| 2017/0338684 | A1 | 11/2017 | Mishriki et al. | |
| 2017/0358960 | A1 | 12/2017 | Percebon | |
| 2018/0013310 | A1 | 1/2018 | Moussaoui et al. | |
| 2018/0019624 | A1 | 1/2018 | Chen | |
| 2018/0034327 | A1 | 2/2018 | Ren et al. | |
| 2018/0052649 | A1 | 2/2018 | Patel | |
| 2018/0061563 | A1 | 3/2018 | Budhia et al. | |
| 2018/0062416 | A1 | 3/2018 | Terry et al. | |
| 2018/0062442 | A1 | 3/2018 | Qiu et al. | |
| 2018/0090954 | A1 | 3/2018 | Graham et al. | |
| 2018/0090955 | A1 | 3/2018 | Graham et al. | |
| 2018/0090999 | A1 | 3/2018 | Graham et al. | |
| 2018/0091000 | A1 | 3/2018 | Jol et al. | |
| 2018/0097403 | A1* | 4/2018 | Jung | H02J 50/40 |
| 2018/0114634 | A1* | 4/2018 | Lin | H01F 38/14 |
| 2018/0131235 | A1 | 5/2018 | Inoue et al. | |
| 2018/0175671 | A1 | 6/2018 | Ren | |
| 2018/0219403 | A1 | 8/2018 | Schneider | |
| 2018/0233954 | A1 | 8/2018 | Yang et al. | |
| 2018/0301933 | A1 | 10/2018 | Lee et al. | |
| 2018/0301936 | A1 | 10/2018 | Lee et al. | |
| 2018/0323634 | A1 | 11/2018 | Lee | |
| 2019/0027298 | A1 | 1/2019 | Jadidian et al. | |
| 2019/0052103 | A1 | 2/2019 | Li et al. | |
| 2019/0068000 | A1 | 2/2019 | De Rooij et al. | |
| 2019/0089187 | A1 | 3/2019 | Konomi | |
| 2020/0120762 | A1* | 4/2020 | Ok | H05B 6/065 |
| 2020/0212721 | A1 | 7/2020 | Narayana Bhat et al. | |
| 2021/0028653 | A1 | 1/2021 | Park et al. | |
| 2021/0127459 | A1* | 4/2021 | Ok | H05B 6/1272 |
| 2022/0085662 | A1 | 3/2022 | Narayana Bhat et al. | |
| 2022/0344979 | A1 | 10/2022 | Kanakasabai et al. | |

FOREIGN PATENT DOCUMENTS

| | | |
|---|---|---|
| CN | 108711945 | 10/2018 |
| EP | 2555378 | 2/2013 |
| JP | 2011045236 | 3/2011 |
| JP | 2011045236 A | 3/2011 |
| JP | 2011174827 | 9/2011 |
| JP | 2013110848 | 6/2013 |
| JP | 2014230399 | 12/2014 |
| JP | 2015019484 | 1/2015 |
| JP | 2017022861 | 1/2017 |
| JP | 2017525332 | 8/2017 |
| JP | 2017536067 | 11/2017 |
| JP | 2018177186 | 11/2018 |
| KR | 20130083660 | 7/2013 |
| WO | 2014176838 | 11/2014 |
| WO | 2014176855 | 11/2014 |
| WO | 2016005984 | 1/2016 |
| WO | 2016045212 | 3/2016 |
| WO | 2016045213 | 3/2016 |
| WO | 2017176128 | 10/2017 |
| WO | 2018057656 | 3/2018 |
| WO | 2016163838 | 8/2018 |
| WO | 2018149381 | 8/2018 |
| WO | 2018155858 | 8/2018 |
| WO | 2018196284 | 11/2018 |
| WO | 2019004753 | 1/2019 |
| WO | 2019028474 | 2/2019 |
| WO | 2019107715 | 6/2019 |
| WO | 2020236922 | 11/2020 |
| WO | 2021046204 | 3/2021 |

OTHER PUBLICATIONS

"India Application No. 201911020202 Examination Report", Feb. 5, 2024, 5 pages.
"Japan patent Application No. 2021-568983 1st Office Action", May 14, 2024.
"China application No. 202080052590.6 Second Office Action", Jan. 18, 2025.
"Japan patent application 2022512716 NOA", Dec. 13, 2024, 2 pages.
"EP Application No. 20 772 182.0-1002 Communication pursuant to Art 94", Jan. 29, 2025, 6 pages.
"Korean application No. 10-2022-7011146 Request for Submission of Opinion", Feb. 17, 2025, 5 pages.
"Japan Patent Application No. 2022-512716 1st Office Action", Sep. 3, 2024, 6 pages.
"U.S. Appl. No. 18/444,073 Final Office Action", Sep. 11, 2024, 18 pages.
"China application No. 2020800525906 Decision of Rejection", Apr. 18, 2025; 5 pages.
"U.S. Appl. No. 18/444,073 Final Office Action"; Feb. 5, 2026; 21 pages.
"China Application No. 2020800612497 Notification of Entry into the Procedure of Substantive Examination of Patent Application", Jun. 24, 2022, 1 page.
"China patent application No. 202080052590.6 Office Action", Jul. 26, 2024, 13 pages.
"India Application No. 201911035597 First Examination Report", Aug. 3, 2021, 6 pages.
"PCT Application No. PCT/US2020/049180 International Search Report and Written Opinion", Nov. 13, 2020.
"U.S. Appl. No. 17/640,398 Final Office Action", Feb. 8, 2024, 13 pages.

(56) References Cited

OTHER PUBLICATIONS

"U.S. Appl. No. 17/640,298 Non Final Office Action", May 30, 2023, 10 pages.
"U.S. Appl. No. 18/444,073 Non Final Office Action", Jul. 31, 2024, 13 pages.

* cited by examiner

WIRELESS POWER TRANSMISSION APPARATUS WITH MULTIPLE PRIMARY COILS AND ADJACENT COIL MUTING

RELATED APPLICATIONS

This application is a national stage of International Application No. PCT/US2020/033782, filed May 20, 2020, which claims the benefit of priority to India Patent Application No. 201911020202, filed May 21, 2019, the disclosures of which are incorporated herein by reference.

TECHNICAL FIELD

This disclosure relates generally to wireless power, and more specifically, to a wireless power transmission apparatus.

DESCRIPTION OF THE RELATED TECHNOLOGY

Conventional wireless power systems have been developed with a primary objective of charging a battery in a wireless power receiving apparatus, such as a mobile device, a small electronic device, gadget, or the like. In a conventional wireless power system, a wireless power transmission apparatus may include a primary coil that produces an electromagnetic field. The electromagnetic field may induce a voltage in a secondary coil of a wireless power receiving apparatus when the secondary coil is placed in proximity to the primary coil. In this configuration, the electromagnetic field may transfer power to the secondary coil wirelessly. The power may be transferred using resonant or non-resonant inductive coupling between the primary coil and the secondary coil. The wireless power receiving apparatus may use the received power to operate or may store the received energy in a battery for subsequent use. The power transfer capability may be related to how closely the primary coil and secondary coil are positioned to each other. Therefore, in some traditional wireless power systems, the structure of the wireless power transmission apparatus may be designed to limit positioning of the wireless power receiving apparatus and impose an expected alignment between the primary coil and secondary coil.

SUMMARY

The systems, methods and apparatuses of this disclosure each have several innovative aspects, no single one of which is solely responsible for the desirable attributes disclosed herein.

One innovative aspect of the subject matter described in this disclosure can be implemented in a wireless power transmission apparatus. In some implementations, the wireless power transmission apparatus may include a plurality of primary coils organized into at least a first group of primary coils and a second group of primary coils. The wireless power transmission apparatus may include at least a first local controller associated with the first group of primary coils and a second local controller associated with the second group of primary coils. A plurality of switches in the wireless power transmission apparatus may be capable of individually coupling the first local controller to one primary coil of the first group of primary coils and individually coupling the second local controller to one primary coil of the second group of primary coils. The wireless power transmission apparatus may include a master controller configured to operate the plurality of switches to control which primary coil of the first group of primary coils is coupled to the first local controller and which primary coil of the second group of primary coils is coupled to the second local controller.

In some implementations, the master controller may be configured to determine that a first primary coil of the plurality of primary coils is providing wireless power to a first wireless power receiving apparatus. The master controller may operate the plurality of switches such that one or more adjacent primary coils near the first primary coil remain uncoupled from its respective local controller while the first primary coil is providing the wireless power to the first wireless power receiving apparatus.

In some implementations, the master controller may be configured to disable the first local controller before changing a state of the plurality of switches to control which primary coil of the first group of primary coils is coupled to the first local controller. Disabling the first local controller may prevent current from traversing from the first local controller via the plurality of switches while the state of the plurality of switches is changed. The master controller may enable the first local controller after changing the state of the plurality of switches to control which primary coil of the first group of primary coils is coupled to the first local controller.

In some implementations, the plurality of switches include a first set of switches configured to individually couple the first local controller to one primary coil of the first group of primary coils a and a second set of switches configured to individually couple the second local controller to one primary coil of the second group of primary coils.

In some implementations, the wireless power transmission apparatus may include a plurality of local controllers including at least the first local controller and the second local controller. At least the first local controller may include a communication unit capable of receiving a communication from a first wireless power receiving apparatus via a first primary coil when the first wireless power receiving apparatus is in proximity to the first primary coil and when the first local controller is coupled to the first primary coil. The first local controller may include a control unit configured to manage operation of a driver in response to receiving the communication from the first wireless power receiving apparatus. The first local controller may include the driver configured to generate an electrical output to the first primary coil when the first primary coil is coupled to the first local controller via the plurality of switches.

In some implementations, the first local controller may be configured to determine a status signal to send to the master controller, wherein the status signal is based, at least in part, on the communication from the first wireless power receiving apparatus, a wireless power transfer status, the electrical output being generated to the first primary coil, a fault condition associated with charging the first wireless power receiving apparatus, or any combination thereof. The first local controller may be configured to send the status signal to the master controller.

In some implementations, the master controller may be configured to determine that the first primary coil is not providing wireless power to the first wireless power receiving apparatus based, at least in part, on the status signal. The master controller may operate the plurality of switches to couple the first local controller to one or more other primary coils of the first group of primary coils.

In some implementations, the master controller may be configured to determine that the first primary coil is providing wireless power to the first wireless power receiving apparatus based, at least in part, on the status signal. The master controller may prevent the plurality of switches from uncoupling the first local controller from the first primary coil while the status signal indicates that the first primary coil is providing wireless power to the first wireless power receiving apparatus.

In some implementations, the master controller may be configured to prevent the plurality of switches from coupling one or more adjacent primary coils near the first primary coil to its respective local controller while the status signal indicates that the first primary coil is providing the wireless power to the first wireless power receiving apparatus.

In some implementations, the master controller may be configured to cause the plurality of switches to sequentially couple primary coils of the first group of primary coils to the first local controller. For each primary coil of the first group of primary coils, the master controller may receive a status signal from the first local controller. The status signal may indicate whether the first local controller detects a first wireless power receiving apparatus at the coupled primary coil.

In some implementations, the master controller may be configured to cause the plurality of switches to concurrently couple a first primary coil of the first group of primary coils to the first local controller and couple a second primary coil of the second group of primary coils to the second local controller. The first primary coil and the second primary coil may not be adjacent to each other.

In some implementations, the master controller may be configured to operate the plurality of switches to such that each of the plurality of primary coils are coupled to a respective local controller according to a pattern that prevents adjacent primary coils from being coupled at the same time.

In some implementations, each group of primary coils may include at least two primary coils that can selectively be coupled to a local controller. Each group of primary coils may be coupled to the local controller for the group via at least one switch.

In some implementations, the first group of primary coils may include three primary coils that are selectively coupled to the first local controller via two switches.

In some implementations, the wireless power transmission apparatus may include a charging pad on which multiple wireless power receiving apparatuses may be placed. The plurality of primary coils may be arranged in an overlapping pattern that is distributed among multiple layers of the charging pad.

In some implementations, at least a subset of the plurality of primary coils may be constructed from graphene.

In some implementations, the first local controller may be configured cause at least a first primary coil of the first group of primary coils to transmit wireless power to a first wireless power receiving apparatus in response to a communication from the first wireless power receiving apparatus via the first primary coil when the first wireless power receiving apparatus is in proximity to the first primary coil and when the first local controller is coupled to the first primary coil. The second local controller may be configured cause at least a second primary coil of the second group of primary coils to transmit wireless power to a second wireless power receiving apparatus in response to a communication from the second wireless power receiving apparatus via the second primary coil when the second wireless power receiving apparatus is in proximity to the second primary coil and when the second local controller is coupled to the second primary coil.

In some implementations, the first primary coil and the second primary coil may not be adjacent to each other. The first primary coil and the second primary coil may be configured to concurrently transmit wireless power to the first wireless power receiving apparatus and the second wireless power receiving apparatus, respectively.

In some implementations, the plurality of switches may comprise mechanical or solid-state relays which are controlled switches with a normally-closed (NC) and normally-open (NO) terminals. The switching of state between the NC and NO terminals is managed by the master controller Another innovative aspect of the subject matter described in this disclosure can be implemented as a method performed by a wireless power transmission apparatus. In some implementations, the method may include managing connections, via a plurality of switches, between a plurality of primary coils and respective local controllers. The method may include determining that a first primary coil of the plurality of primary coils is providing wireless power to a first wireless power receiving apparatus. The method may include operating, by a master controller, the plurality of switches such that one or more adjacent primary coils near the first primary coil remain uncoupled from its respective local controller while the first primary coil is providing the wireless power to the first wireless power receiving apparatus.

In some implementations, the plurality of primary coils may be organized into at least a first group of primary coils that can be individually coupled to a first local controller via a first subset of the plurality of switches and a second group of primary coils that can be individually coupled to a second local controller via a second subset of the plurality of switches.

In some implementations, the method may include disabling the first local controller before changing a state of the plurality of switches to control which primary coil of the first group of primary coils is coupled to the first local controller. Disabling the first local controller prevents current from traversing from the first local controller via the plurality of switches while the state of the plurality of switches is changed. The method may include enabling the first local controller after changing the state of the plurality of switches to control which primary coil of the first group of primary coils is coupled to the first local controller.

In some implementations, the method may include receiving, by the first local controller, a communication from the first wireless power receiving apparatus via the first primary coil when the first wireless power receiving apparatus is in proximity to the first primary coil and when the first local controller is coupled to the first primary coil. The method may include determining, by the first local controller, a status signal to send to the master controller, wherein the status signal is based, at least in part, on the communication from the first wireless power receiving apparatus, a wireless power transfer status, the electrical output being generated to the first primary coil, a fault condition associated with charging the first wireless power receiving apparatus, or any combination thereof. The method may include sending the status signal from the first local controller to the master controller.

In some implementations, the method may include determining that the first primary coil is not providing wireless power to the first wireless power receiving apparatus based, at least in part, on the status signal. The method may include operating the plurality of switches to couple the first local controller to one or more other primary coils of the first group of primary coils.

In some implementations, the method may include determining, by the master controller, that the first primary coil is providing wireless power to the first wireless power receiving apparatus based, at least in part, on the status signal. The method may include preventing, by the master controller, the plurality of switches from uncoupling the first local controller from the first primary coil while the status signal indicates that the first primary coil is providing wireless power to the first wireless power receiving apparatus.

In some implementations, the method may include preventing the plurality of switches from coupling one or more adjacent primary coils near the first primary coil to its respective local controller while the status signal indicates that the first primary coil is providing the wireless power to the first wireless power receiving apparatus.

In some implementations, the method may include causing the plurality of switches to sequentially couple primary coils of a first group of primary coils to a first local controller. The method may include, for each primary coil of the first group of primary coils, receiving a status signal from the first local controller, the status signal indicating whether the first local controller detects the first wireless power receiving apparatus at the coupled primary coil.

In some implementations, the method may include causing the plurality of switches to concurrently couple the first primary coil of a first group of primary coils to a first local controller and couple a second primary coil of a second group of primary coils to a second local controller. The first primary coil and the second primary coil may not be adjacent to each other.

In some implementations, the method may include operating the plurality of switches to such that each of the plurality of primary coils are coupled to a respective local controller according to a pattern that prevents adjacent primary coils from being coupled at the same time.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
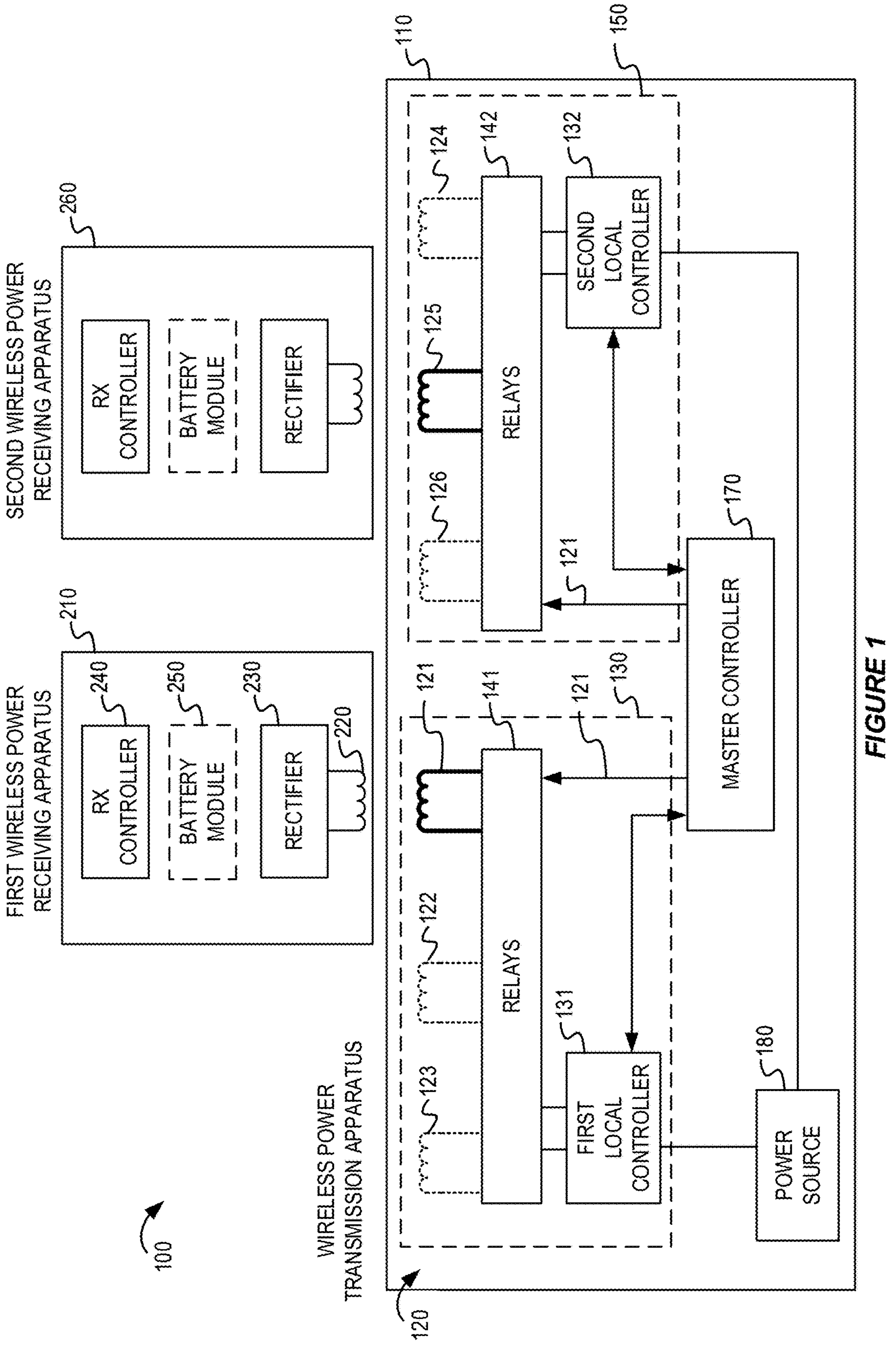
FIG. 1 shows an overview of components associated with an example wireless power system according to some implementations.

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system or method for transmitting or receiving wireless power.

A conventional wireless power system may include a wireless power transmission apparatus and a wireless power receiving apparatus. A wireless power transmission apparatus may include a primary coil that transmits wireless energy (as a wireless power signal) to a corresponding secondary coil in the wireless power receiving apparatus. A primary coil refers to a source of wireless energy (such as inductive or magnetic resonant energy) in a wireless power transmission apparatus. A secondary coil in a wireless power receiving apparatus receives the wireless energy. Wireless power transmission is more efficient when the primary and secondary coils are closely positioned. Conversely, the efficiency may decrease (or the power transfer may cease) when the primary and secondary coils are misaligned. A conventional wireless power transmission apparatus may include a controller that enables or disables the transmission of wireless energy based on how closely the wireless power receiving apparatus is positioned in relation to the wireless power transmission apparatus. For example, the transmission of wireless energy may depend on the degree of alignment between transmitting and receiving coils. In this disclosure, alignment may refer to a spatial relationship between a secondary coil of the wireless power receiving apparatus and a primary coil of the wireless power transmission apparatus.

In an effort to address misalignment concerns and to provide a greater degree of positioning flexibility, some wireless power transmission apparatuses may include multiple primary coils. For example, a charging surface of the wireless power transmission apparatus may have an arrangement of primary coils. The primary coils may be configured in an overlapping or in a non-overlapping arrangement. The arrangement of primary coils (overlapping or non-overlapping) may be designed to minimize, reduce, or eliminate dead zones. Depending on an orientation and position of the wireless power receiving apparatus on the charging surface, different primary coils may be activated to provide power to corresponding secondary coils of the wireless power receiving apparatus. Thus, the wireless power transmission apparatus may support positional freedom such that a wireless power receiving apparatus may be charged regardless of positioning or orientation of the wireless power receiving apparatus with regard to the charging surface. Furthermore, multiple wireless power receiving apparatuses may be concurrently charged using different primary coils of the wireless power transmission apparatus. However, when a wireless power transmission apparatus has multiple primary coils, it is possible for unused primary coils to create undesirable electromagnetic interference (EMI) to a nearby primary that is providing wireless power to a wireless power receiving apparatus.

In accordance with this disclosure, a wireless power transmission apparatus may have a plurality of primary coils that can be selectively and individually coupled to a local controller. A local controller may include communications capabilities, control capabilities, a driver, or other power signal generating circuits. In some implementations, the local controller (when connected to one of the primary coils) may implement wireless power transfer according to a standardized wireless power specification, such as the Qi® specification provided by the Wireless Power Consortium. For example, the wireless power transmission apparatus may include multiple primary coils, where each primary coil can be connected to a local controller to conform to the Qi specification.

In some implementations, the primary coils may be organized in groups of primary coils that can be managed separately. A group of primary coils may be referred to as a zone in some aspects of this disclosure. Each zone of the wireless power transmission apparatus may have separate zone circuitry capable or connecting to a primary coil in the zone such that each primary coil can be energized independently. For example, the zone circuitry may include a local controller, driver, voltage regulator, tank circuit capacitor and the like, that is common for all primary coils associated with the zone. The zone circuitry may be connected to different primary coils using one or more relays or switches. A relay is a type of switch. For example, a relay may be an electro-mechanical or solid-state switch which can be controlled by a control signal. In some implementations, a relay may have a common terminal, a normally-closed (NC) terminal and a normally-open (NO) terminal. When the control signal is not activated (not energized), an internal switching mechanism of the relay may connect the common terminal to the NC terminal. When the control signal is active (energized), the internal switching mechanism may connect the common terminal to the NO terminal. In some implementations, a relay may be a packaged electrical component that includes a switch which is activated or deactivated by a control signal. Therefore, the terms relay, controllable switch, or switch may be used interchangeably in this description. While the examples of this disclosure may refer to relays for brevity, it should be understood that other types of switches may be used to connect the zone circuitry to a primary coil The connections between primary coils and the local controller may be made through relays (or other types of switches). The state of one or more relays may determine which primary coil in the zone is connected to the zone circuitry. While the zone circuitry is common for all the primary coils in the zone, only one primary coil can use the zone circuitry at a time. The local controller may use a digital ping or other current sensing techniques to determine whether wireless power receiving apparatus is located near the primary coil with which the local controller is currently connected. For example, when the local controller receives a communication from the wireless power receiving apparatus in response to a ping action, the local controller may determine that the wireless power receiving apparatus is in proximity to the primary coil that is currently connected to the local controller. The local controller may cause the primary coil to provide wireless energy to the secondary coil of the wireless power receiving apparatus. For example, the local controller may activate the driver to cause the connected primary coil to transmit wireless power. While a first primary coil of the zone is providing power to the wireless power receiving apparatus, the other primary coils will remain disconnected based on the state of the relays.

In some implementations, a master controller may manage the states of the relays in the zone to effectively enable or disable different primary coils. Furthermore, the wireless power transmission apparatus may include multiple groups (zones) of primary coils that can be connected or disconnected to respective zone circuitry. The master controller may manage the relays in multiple zones to prevent adjacent primary coils from activating or pinging while a first primary coil is providing power to a wireless power receiving apparatus. For example, if the adjacent primary coils were activated, the adjacent primary coils could create undesirable EMI, disrupt the wireless power session of the first primary coil, or impact the efficiency of the wireless power session. Therefore, in some implementations, the master controller may disable or disconnect (also referred to as "muting") the adjacent primary coils to prevent the adjacent primary coils (near the first primary coil) from transmitting energy or pinging. Muting an adjacent primary coil may be performed by either preventing the adjacent primary coil from being connected through the relay to a local controller or by disabling the local controller in a neighboring zone.

In some implementations, the master controller may disable the zone circuitry before changing states of the relays for the zone. Due to the power connected through the relay, having a current active at the time of switching a relay could result in damage to the relay, a reduced life of the relay, or both. Therefore, in some implementations, the master controller may disable or deactivate the local controller in a zone before making a change to the relay connection in that zone. After a short time following the change in the state of the relays, the master controller may reenable or activate the local controller. This may extend the life of the relays and improve the reliability of the local controller in detecting a wireless power receiving apparatus since the relays can be fully changed under a zero-current environment.

In some implementations, the master controller may use a pattern when determining which primary coils in the various zones to connect to their respective local controllers. For example, when a first primary coil is connected to a first local controller to perform a digital ping or detection procedure, the master controller may avoid connecting an adjacent primary coil to its respective local controller. The pattern may be used to alternate which sets of primary coils are pinging so that adjacent or nearby primary coils are not pinging concurrently.

In some implementations, the primary coils are made of a material that improves the reliability and efficiency of the wireless power transmission apparatus. For example, some or all of the primary coils may be made of a graphene material that has a higher conductivity and smaller size than conventional materials (such as copper wire). Having a smaller size may result in thinner layers of overlapping primary coils so that the power transfer is more uniform for primary coils in the different layers.

Particular implementations of the subject matter described in this disclosure can be implemented to realize one or more of the following potential advantages. In some implementations, the described techniques can be used to enable charging of one or more wireless power receiving apparatuses in various positions or orientations. The efficiency of the wireless power transmission apparatus may be improved by selectively connecting separate primary coils to local controllers for each zone. The electronics in the wireless power transmission apparatus may use a modular design with common components used for groups of primary coils that form different zones. Cost and complexity of the wireless power system may be reduced by using fewer local controllers compared to systems that use one local controller for each primary coil. Furthermore, the ability to mute adjacent primary coils may improve the efficiency, speed, and reliability of providing power to a wireless power receiving apparatus. For example, muting the adjacent primary coils may prevent disturbance that would otherwise impact the charging time used to charge the wireless power receiving apparatus.

FIG. 1 shows an overview of components associated with an example wireless power system according to some implementations. The wireless power transmission apparatus 110 may include a power source 180 which is configured to provide power to various zones in the wireless power transmission apparatus 110. The power source 180 may convert alternating current (AC) to direct current (DC). The wireless power system 100 includes a wireless power transmission apparatus 110 which has a plurality primary coils 120 (shown as primary coils 121, 122, 123, 124, 125, and 126). Each of the primary coils 120 may be associated with different zone circuitry. For example, a first group of primary coils 121, 122, and 123 may be associated with a first zone 130. A second group of primary coils 123, 125, and 126 may be associated with a second zone 150. The first zone 130 may include common zone circuitry (including a first local controller 131). In this disclosure, the terms zone circuitry and local controller may be used interchangeably. However, it is understood that zone circuitry may include a local controller as well as other circuit components (including resistors, capacitors, drivers, or the like). Each primary coil may be a wire coil which transmits a wireless power signal (which also may be referred to as wireless energy). Each primary coil may be capable (when connected via a relay to a local controller) of transmitting wireless energy using inductive or magnetic resonant field. The zone circuitry may include components (not shown) to prepare the wireless power signal. For example, the zone circuitry may include one or more switches, drivers, capacitors, or other components. An example of the zone circuitry is included in FIG. 3. In some implementations, some or all of the zone circuitry is embodied as an IC that implements features of this disclosure. Similar to the first zone 130, the second zone 150 may have a second local controller 132.

One or more relays 141 in the first zone 130 may control which of the primary coils 121, 122, and 123 are connected to the first local controller 131. Similarly, relays 142 may control which of the primary coils 124, 125, and 126 are connected to the second local controller 132. An example of the relays 141 is included in FIG. 3. A master controller 170 may manage the relays 141, 142 to control which primary coil is coupled to the local controller for each of the zones 130, 150. For example, in FIG. 1, the master controller 170 has configured the relays 141 to connect the first primary coil 121 to the first local controller 131. While the first primary coil 121 is connected to the first local controller 131, the other primary coils 122 and 123 in the first zone 130 will be disconnected. The master controller 170 has connected a second primary coil 125 to the second local controller 132, while the other primary coils 124 and 126 in the second zone 150 are disconnected.

There may be a variety of ways to implement a master controller 170, including a microcontroller, dedicated processor, integrated circuit, application specific integrated circuit (ASIC), or the like. In some implementations, the master controller may be collocated or integrated with one of the local controllers (such as the first local controller 131 or the second local controller 132). For example, an integrated circuit (IC) may implement the features of both the master controller and one or more of the local controllers. Furthermore, in some implementations, a local controller may perform some of the features described as the master controller (in addition to the features of the local controller), including polling of other local controllers, muting of adjacent primary coils, enabling/disabling other local controllers, switching connections between remote primary coils and another local controller, or any combination thereof.

The first local controller 131, when connected to one of the primary coils 121, 122, 123 in the first zone, may be configured to detect the presence or proximity of a wireless power receiving apparatus. For example, the first local controller 131 may cause the connected primary coil to periodically transmit a detection signal and measure for a change in coil current or load that indicates an object near the primary coil. In some implementations, the local controller may detect a ping, wireless communication, load modulation, or the like, to determine that a wireless power receiving apparatus is placed on the wireless power transmission apparatus. In some implementations, the transmitter circuits may perform detection at random times and may operate independently to detect a wireless power receiving apparatus. In some implementations, the transmitter circuits may be configured to perform a detection phase in a pattern such that neighboring primary coils perform the detection phase at deterministic times to reduce neighbor coil interference.

In the example of FIG. 1, a first wireless power receiving apparatus 210 may be detected at a first primary coil 121. The first wireless power receiving apparatus 210 includes a secondary coil 220. A wireless power receiving apparatus may be any type of device capable of receiving wireless power, including a mobile phone, computer, laptop, peripheral, gadget, robot, vehicle, or the like. When a wireless power receiving apparatus (such as the first wireless power receiving apparatus 210) is placed on the wireless power transmission apparatus 110 near the first primary coil 121 and the first local controller 131 is connected to the first primary coil 121 via the relays 141, the first local controller 131 may detect its presence. For example, during a detection phase, the first primary coil 121 may transmit a detection signal (which also may be referred to as a ping). The coil current at the first primary coil 121 may be measured to determine whether the coil current has crossed a threshold indicating an object in the electromagnetic field of the first primary coil 121. If an object is detected, the first local controller 131 may wait for a handshake signal from the first wireless power receiving apparatus 210 (such as an identification signal or setup signal) to determine whether the object is a wireless power receiving apparatus or a foreign object. The handshake signal may be communicated by the first wireless power receiving apparatus 210 using a series of load changes (such as load modulations). The load changes may be detectable by a coil voltage or current sensing circuit and interpreted by the first primary controller 131. The first controller 131 may interpret the variations in the load to recover the communication from the first wireless power receiving apparatus 210. The communication may include information such as charging level, requested voltage, received power, receiver power capability, support for a wireless charging standard, or the like.

The first wireless power receiving apparatus 210 may include a secondary coil 220, a rectifier 230, a receive (RX) controller 240 and an optional battery module 250. In some implementations, the battery module 250 may have an integrated charger (not shown). The secondary coil 220 may generate an induced voltage based on the received wireless power signal from the first primary coil 121. A capacitor (not shown) may be in series between the secondary coil 220 and the rectifier 230. The rectifier 230 may rectify the induced voltage and provide the rectified voltage to the battery module 250. The battery module 250 may be in the wireless power receiving apparatus 210 or may be an external device that is coupled by an electrical interface. The battery module 250 may include a charger stage, protection circuits such as a temperature-detecting circuit, and overvoltage and over-current protection circuits. Alternatively, the receive controller 240 may include a battery charging management module to collect and process information on a charging state of the battery module 250. In some implementations, the receive controller 240 may be configured to communicate with the first local controller 131 using load modulation via the secondary coil 220.

In the example of FIG. 1, because the first wireless power receiving apparatus 210 is detected at the first primary coil 121, the master controller 170 may maintain the connection via the relays 141 between the first primary coil 121 and the first local controller 131. Therefore, the other primary coils 122 and 123 in the first zone 130 will remain disconnected and will not ping or create interference. However, it may be possible for an adjacent primary coil 126 to create interference with the first primary coil 121. Therefore, the master controller may prevent the relays 142 from connecting the primary coil 126 to the second local controller 132. In other words, the master controller may be configured to prevent adjacent primary coils from being connected to their respective local controller even if the adjacent primary coil is part of another zone.

In the example of FIG. 1, a second wireless power receiving apparatus 260 is near the second primary coil 125. As described above, the second local controller 132 may control the second primary coil 125 separately from the other zones. Thus, the second local controller 132 may cause the second primary coil 125 to transmit wireless power to the second wireless power receiving apparatus 260 while the first local controller 131 causes the first primary coil 121 to transmit wireless power to the first wireless power receiving apparatus 210. Furthermore, the first local controller 131 and the second local controller 132 may separately manage the parameters associated with wirelessly charging at their respective primary coils. For example, the voltage level, resonant frequency, power level, or other parameter may be different for each of the first primary coil 121 and the second primary coil 125 based on the type of wireless power receiving apparatus or charging level of their respective batteries.

In some implementations, the master controller 170 may coordinate the operations of multiple local controllers. For example, the master controller 170 may manage the pattern for detection phase by each zone based on an awareness of primary coil adjacency.

Although the example of FIG. 1 shows only six primary coils 121, 122, 123, 124, 125, and 126 organized in two zones 130 and 150, the quantity of primary coils and zones may be different. For example, there may be fewer or greater than three primary coils associated with each zone. Furthermore, the primary coils may be placed in an overlapping or layered arrangement with different zones defined among the arrangement. In some implementations, the zones may be based on which primary coils are close to one another so that when they share a common zone circuitry, the relays for that zone will effectively disable adjacent primary coils based on zone relationship. Alternatively, the zones may include primary coils that are distributed throughout the wireless power transmission apparatus.

Figure 2A:
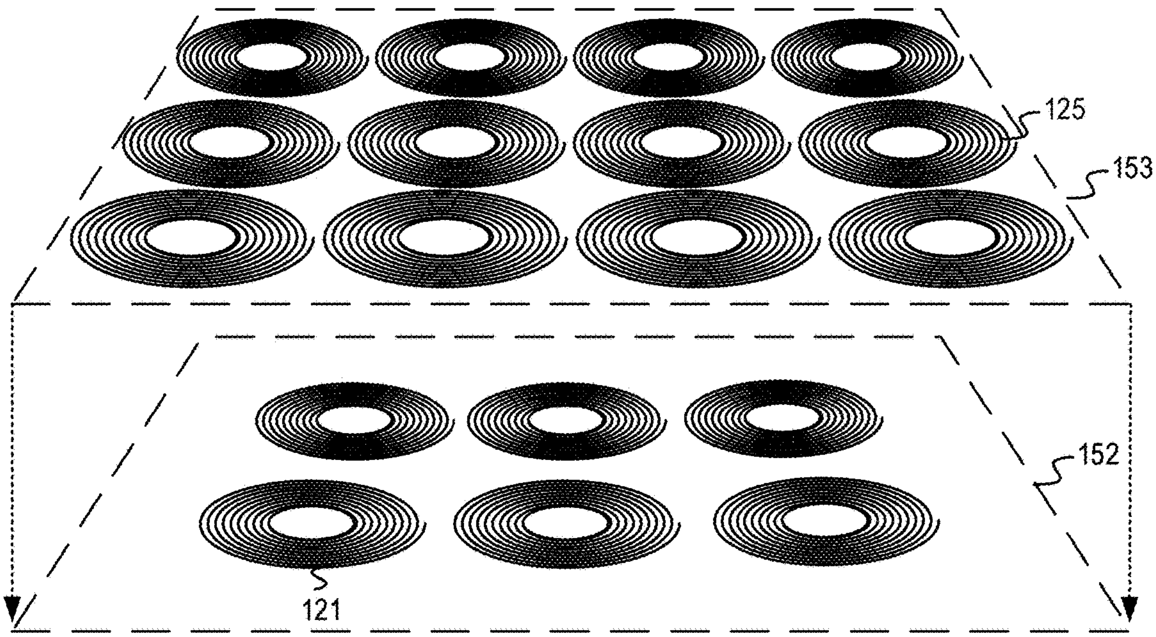
FIG. 2A shows an example wireless power transmission apparatus having multiple layers of primary coils arranged in an overlapping pattern according to some implementations.

FIG. 2A shows an example wireless power transmission apparatus having multiple layers of primary coils arranged in an overlapping pattern according to some implementations. The example wireless power transmission apparatus 200 includes 18 primary coils arranged in two overlapping layers. Once again, the quantity and arrangement of primary coils are provided as an example. Other quantities of primary coils, number of layers, or arrangements may be possible. Furthermore, although the primary coils shown in FIG. 2 appear circular to aid in showing a partially overlapping pattern, other designs may use non-circular primary coils. For example, the primary coils may be square shape (or rounded square shape) similar to those shown in FIGS. 5-7. The design in FIG. 2 may be used to show how a multi-layer system can provide a partially overlapping arrangement of primary coils in a wireless power transmission apparatus. In this disclosure, a partially overlapping arrangement may include designs which side portions overlie (or coincide).

As shown in FIG. 2A, a plurality of primary coils is distributed among a first layer 152 and a second layer 153. For example, the first primary coil 121 is shown on the first layer 152, along with several other primary coils. The second primary coil 125 is shown on the second layer 153 with other primary coils.

Figure 2B:
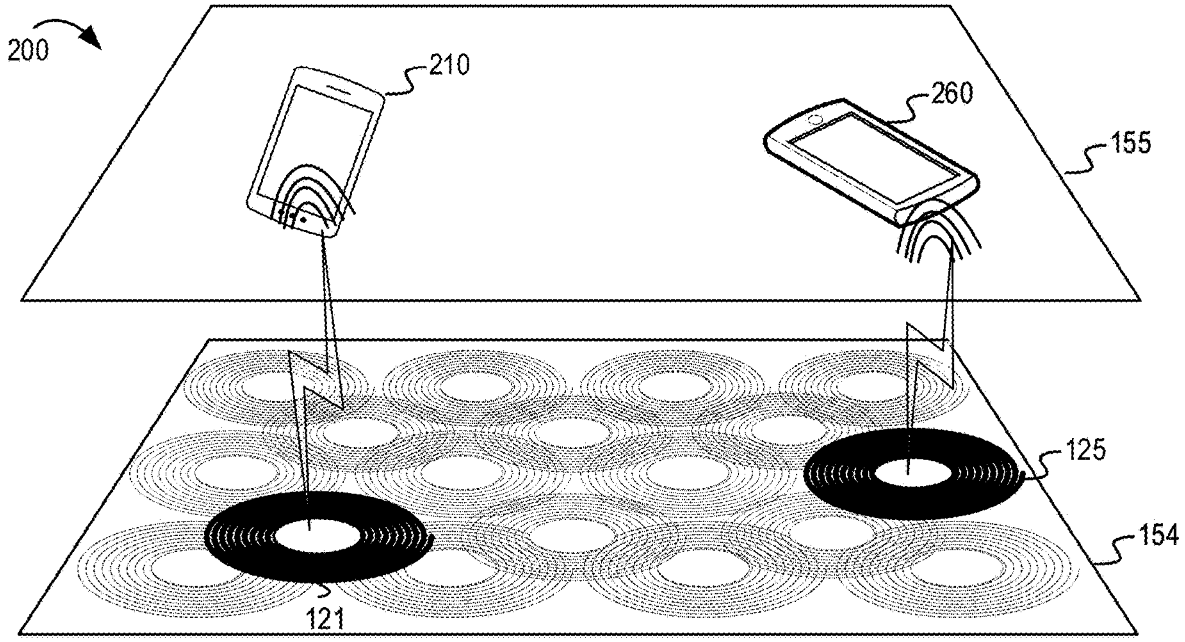
FIG. 2B shows the example wireless power transmission apparatus of FIG. 2*a* with multiple wireless power receiving apparatuses being concurrently charged according to some implementations.

FIG. 2B shows the example wireless power transmission apparatus of FIG. 2A with multiple wireless power receiving apparatuses being concurrently charged according to some implementations. FIG. 2B includes the layers 152, 153 described above as a combined view 154 that shows the coils overlapping. In some implementations, the quantity of coils and overlap may be such that the plurality of primary coils provide coverage for substantially all of the charging surface 155.

In addition to the wireless power transmission apparatus 200, FIG. 2B shows the first wireless power receiving apparatus 210 and the second wireless power receiving apparatus 260 placed on the charging surface 155. The first wireless power receiving apparatus 210 can latch and receive wireless power from the first primary coil 121 based on its position over that transmitter circuit. Similarly, the second wireless power receiving apparatus 260 may latch and receive wireless power from the second primary coil 125. Various optional features may be incorporated into the design of the wireless power transmission apparatus. For example, in some implementations, ferrite material may be used in portions of the wireless power transmission apparatus to maintain a consistent electromagnetic field. The ferrite material may be used to evenly distribute the electromagnetic field.

Figure 3:
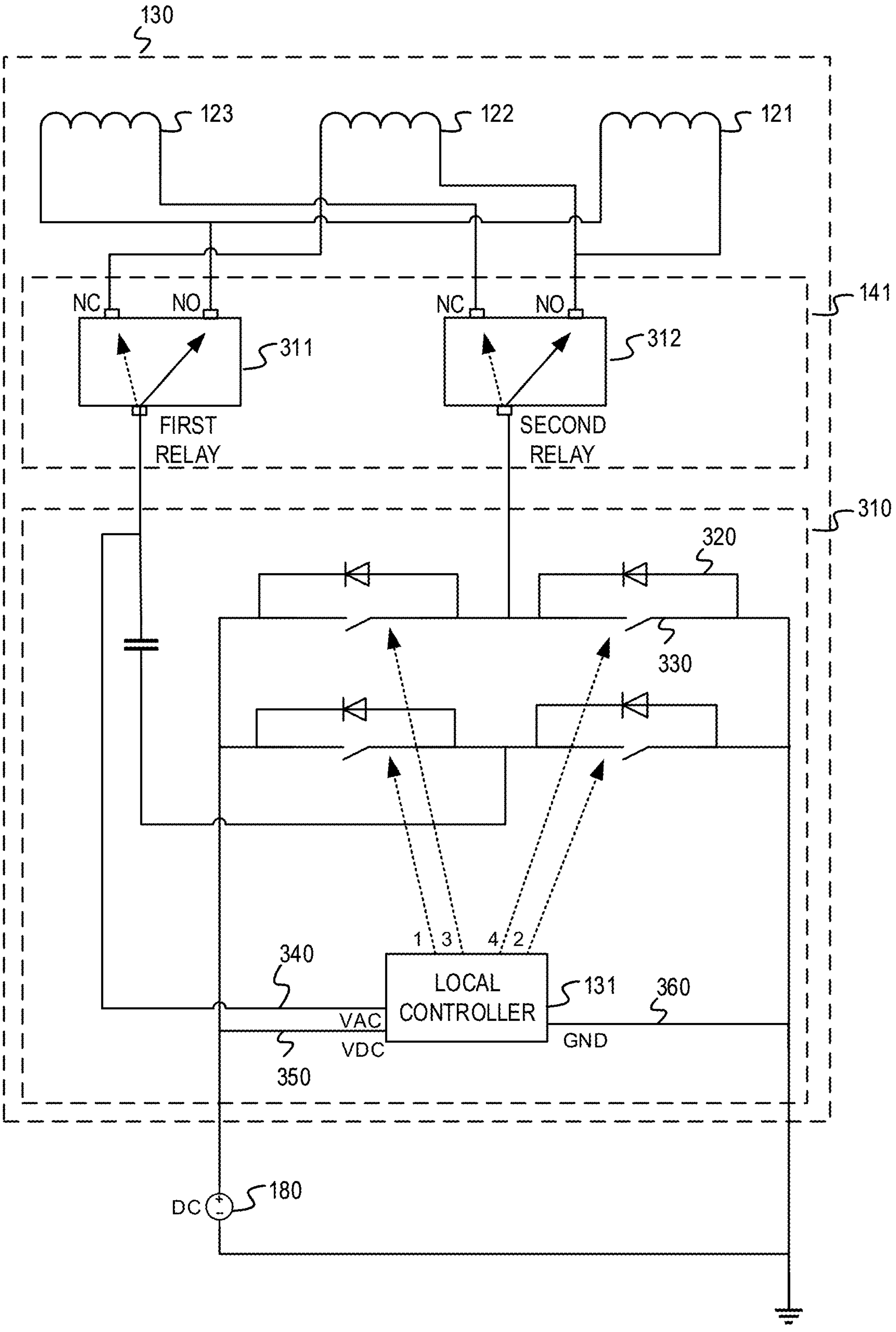
FIG. 3 shows an example group of primary coils that can be individually coupled to a local controller according to some implementations.

FIG. 3 shows an example group of primary coils that can be individually coupled to a local controller according to some implementations. The example first zone 130 in FIG. 3 is one of a multitude of designs which could be used with the present disclosure. In the design of FIG. 3, the first zone 130 includes a first group of primary coils 121, 122, and 123 as well as zone circuitry 310. The zone circuitry 310 includes a first local controller 131 that receives DC power using a DC input line 350 electrically coupled to the power source 180. The DC power may be a particular voltage (such as 5V or 12V). Alternatively, the local controller may include a power conditioning stage to cater to the voltage requirements of the sub modules in the local controllers. The same DC voltage may be electrically coupled to several switches in the zone circuitry 310, such as switch 330. The switch 330 may include a semiconductor switch such as a metal-oxide-semiconductor field-effect transistor (MOSFET), an insulated gate bipolar transistor (IGBT), or the like. Alternatively, the switch 330 may include a mechanical switch. In the example of FIG. 3, each switch may be paired with a diode 320. Other components (such as a driver) are not shown in the figure but may be included in the path.

The first local controller 131 also may switch the devices to covert the power source 180 from a DC output to an AC output across center points of the two legs of the bridge. The coil voltage VAC is fed to the local controller using the link 340. The switches can be used to control the applied voltage to the capacitor-primary coil pair. For example, the first local controller 131 may vary the duty ratio of each switch leg, the phase angle of applied voltage between the switch legs, the frequency of the applied voltage, or a combination thereof. The first local controller 131, switches, drivers, diodes, and the like, may be referred to as the zone circuitry 310. In some implementations, the drivers may be incorporated in the first local controller 131. Furthermore, the first local controller 131 may control the output of the zone circuitry 310 using control lines (marked 1, 2, 3, 4) to each of the switches. The first local controller 131 and switches may be electrically coupled to a ground line 360 to complete the circuit. The capacitor and primary coil form a resonant circuit.

In some implementations, the zone circuitry 310 may include a coil current sensing circuit (not shown). The zone circuitry 310 may be capable of detecting a load change on the first primary coil 121. The coil current sensing circuit may be a current sensor connected in series with the first primary coil 121. The first local controller 131 may determine whether an object is present based on the load change measured by the coil current sensing circuit. The local controller may use the sensed current, the sensed voltage VAC 340 or combination thereof to determine the load change. A communication unit (not shown) also may be present or may be incorporated in the first local controller 131. The communication unit may monitor load changes measured by the coil current sensing circuit and/or VAC 340 to decode load modulated data. The communication unit may receive identification (ID), charging state information, voltage control information, or other information reported by a wireless power receiving apparatus.

Also shown in FIG. 3 are relays 141. The relays 141 include a first relay 311 and a second relay 312. In the example of FIG. 3, two relays can be used to switch coupling of the three primary coils 121, 122, 123 to the zone circuitry 310. Each of the relays 311 and 312 may have two states: normally open (NO) or normally close (NC). The DC voltage 180 may be used to power the relay 311 and 312 coils (not shown) to switch the connection from NC to NO based on a control signal from the master controller (not shown). By changing the states of the relays 311, 312, it is possible to connect the zone circuitry 310 to a particular one of the primary coils. Table 1 shows the states of the relays 311 and 312 that result in different primary coils being connected to the zone circuitry 310. The examples in Table 1 and FIG. 3 are provided only as examples, and other combinations, relay circuits, or states may be implemented by persons of skill in the art.

TABLE 1

| zone circuitry 310 connected to: | First relay 311 | Second relay 312 |
|---|---|---|
| other primary coil 123 | NO | NC |
| other primary coil 122 | NC | NO |
| first primary coil 121 | NO | NO |
| None (natural state) | NC | NC |

Figure 4:
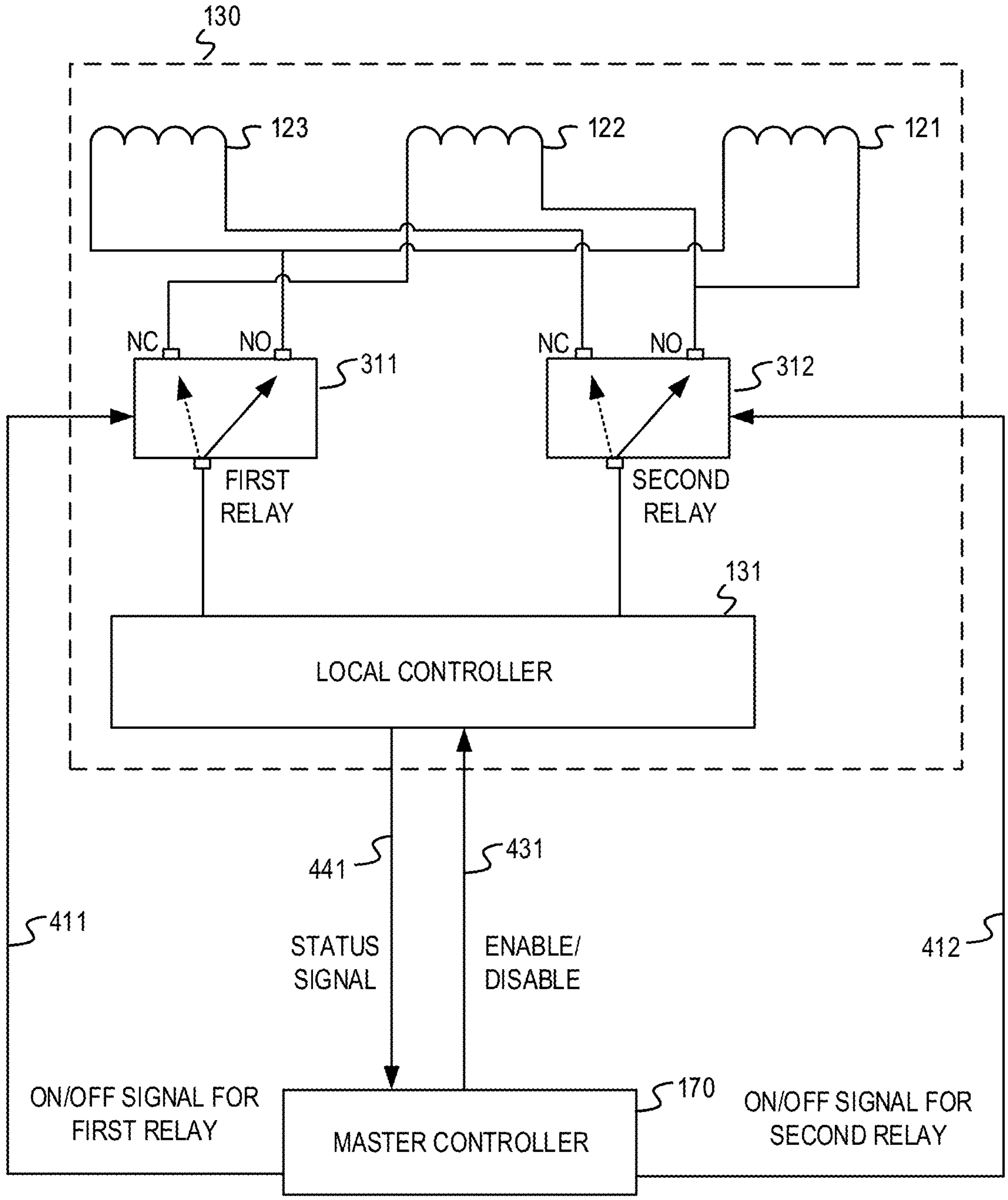
FIG. 4 shows an example group of primary coils and a local controller that can be managed by a master controller according to some implementations.

FIG. 4 shows an example group of primary coils and a local controller that can be managed by a master controller according to some implementations. Building on the description of FIG. 3, FIG. 4 shows how the master controller 170 may manage the operation of the first zone 130, including switches 311 and 312 and the first local controller 131. Other portions of the zone circuitry are omitted from FIG. 4 for brevity.

The master controller 170 may have control a first control link 411 to the first relay 311 and a second control line 412 to the second relay 312. The first and second control lines may be on/off signals for switching the states of the relays 311 and 312. However, as described above, it may cause reduction in life of the relays 311 and 312 if they are switched states while current is flowing through them to one of the primary coils from the first local controller 131. Therefore, in some implementations, the master controller 170 may have a control line 431 to the first local controller 131. The control line 431 may be used to enable or disable the first local controller 131. For example, control line 431 may signal to the first local controller 131 to disable the electronics of the local controller (or any other zone circuitry controlled by the local controller) so that no current flows to the relays 311 and 312. After disabling the first local controller 131, the master controller 170 may change the states of the relays 311 and 312. The master controller 170 may delay for a period of time (for example, 100 milliseconds) before sending an enable signal via the control line 431 to the first local controller 131.

In some implementations, the master controller 170 also may receive a status signal via a control line 441 from the first local controller 131 to the master controller 170. For example, the status signal may indicate whether the first local controller 131 is currently latched (providing power) to a wireless power receiving apparatus. In other examples, the status signal may indicate an operational state, charging status, or other information available from the first local controller 131. In some implementations, the first local controller may determine the status signal based a condition, such as the communication from the first wireless power receiving apparatus, a wireless power transfer status, the electrical output being generated to the first primary coil, a fault condition associated with charging the first wireless power receiving apparatus, or any combination thereof. In some implementations, the status signal may be an "on" or "off" signal to indicate whether the first local controller is successfully charging the wireless power receiving apparatus. In some other implementations, the status signal may include a formatted message (such as tag-length-value (TLV), information elements, or some other formatting to convey additional status information). In yet other implementations, the status signal may be transmitted as a digital pulse signal via control line 441. The master controller may be configured to interpret the digital pulse signal to determine the status of the first local controller 131.

In some implementations, the status signal (or another interface between the first local controller and the master controller) may indicate a fault condition (such as due to over current, a foreign object detection, low quality factor, misalignment, or the like). In the case of a fault condition, the master controller may disable the first local controller 131 using control line 431. For example, if the status signal indicates that the first local controller 131 has a poor connection to the wireless power receiving apparatus or that a foreign object is detected, the master controller 170 may disable the first local controller 131, change the states of the relays 311 and 312, and reenable the first local controller 131 to see if a different primary coil can achieve a better connection to the wireless power receiving apparatus.

Figure 5:
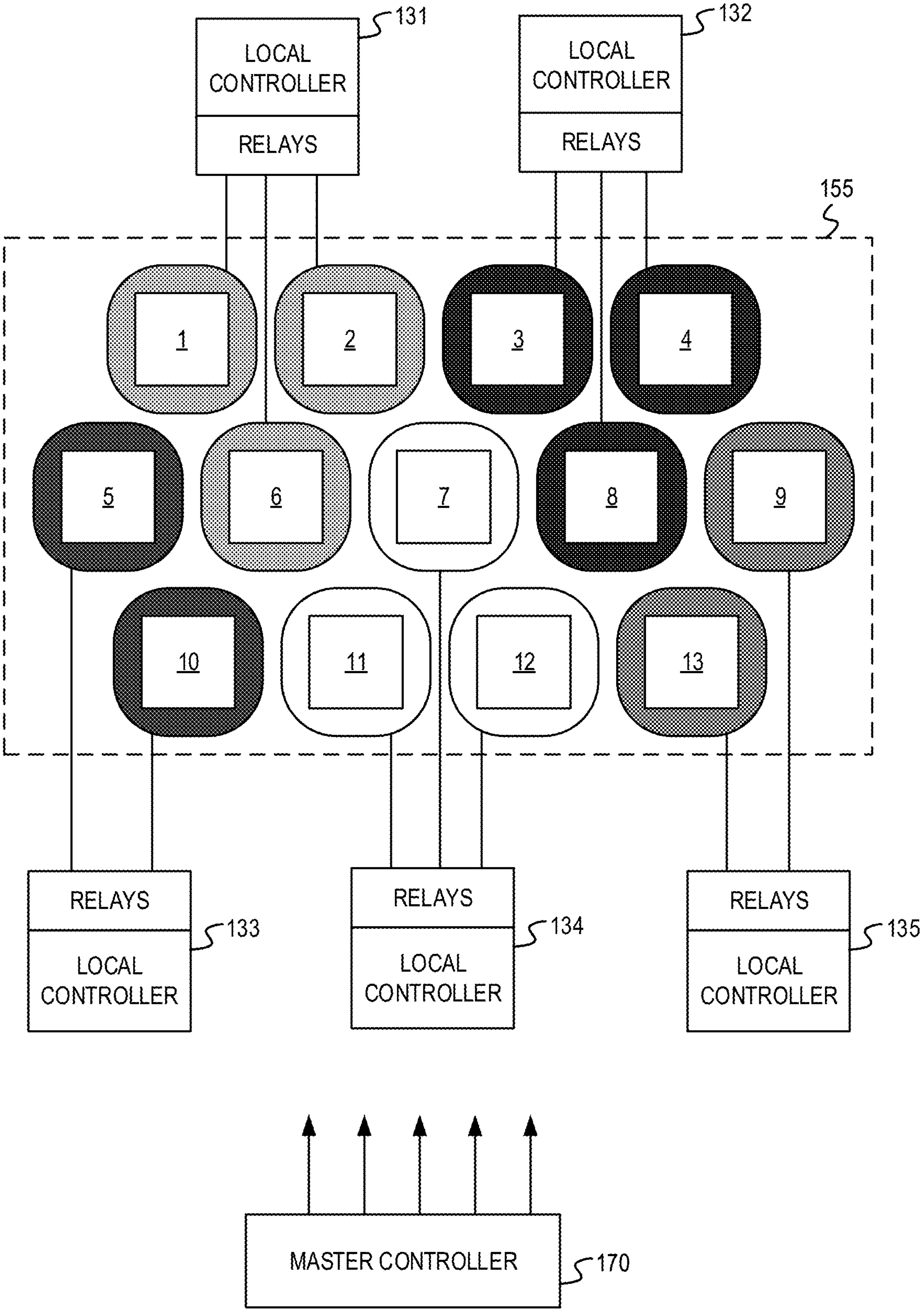
FIG. 5 shows an example arrangement using multiple primary coils according to some implementations.

FIG. 5 shows an example arrangement using multiple primary coils according to some implementations. The charging surface in FIG. 5 shows the arrangement of 13 primary coils (numbered 1-13) grouped into five zones. The primary coils for each zone are shaded with similar gray-scale shading for easier reference. A first local controller 131 (associated with a first zone) can be coupled via relays to any of the primary coils 1, 2, and 6. A second local controller 132 (associated with a second zone) can be coupled via relays to any of the primary coils 3, 4, and 8. A third local controller 133 (associated with a third zone) can be coupled via relays to any of the primary coils 5 and 10. It is noted that while the first and second zones may have two relays (as described in FIG. 3), the third zone may only a single relay since there are only two primary coils in the third zone. A fourth local controller 134 (associated with a fourth zone) can be coupled via relays to any of the primary coils 7, 11, and 12. A fifth local controller 135 (associated with a fifth zone) can be coupled via relays to any of the primary coils 9 and 13. This arrangement will be used to describe example scenarios in FIGS. 6 and 7. While the illustration in FIGS. 5-7 show the coils as non-overlapping, in some implementations the coils may be partially overlapped.

FIG. 5 shows that a master controller 170 may manage multiple zones. In particular, the master controller 170 may have control lines (similar to control lines 411, 412, 431, and 441 described in FIG. 4) to each of the five zones in FIG. 5. The master controller 170 may control which primary coils throughout the wireless power transmission apparatus are connected to their respective local controllers 131, 132, 133, 134, and 135 using the control lines to the relays for each zone.

Figure 6:
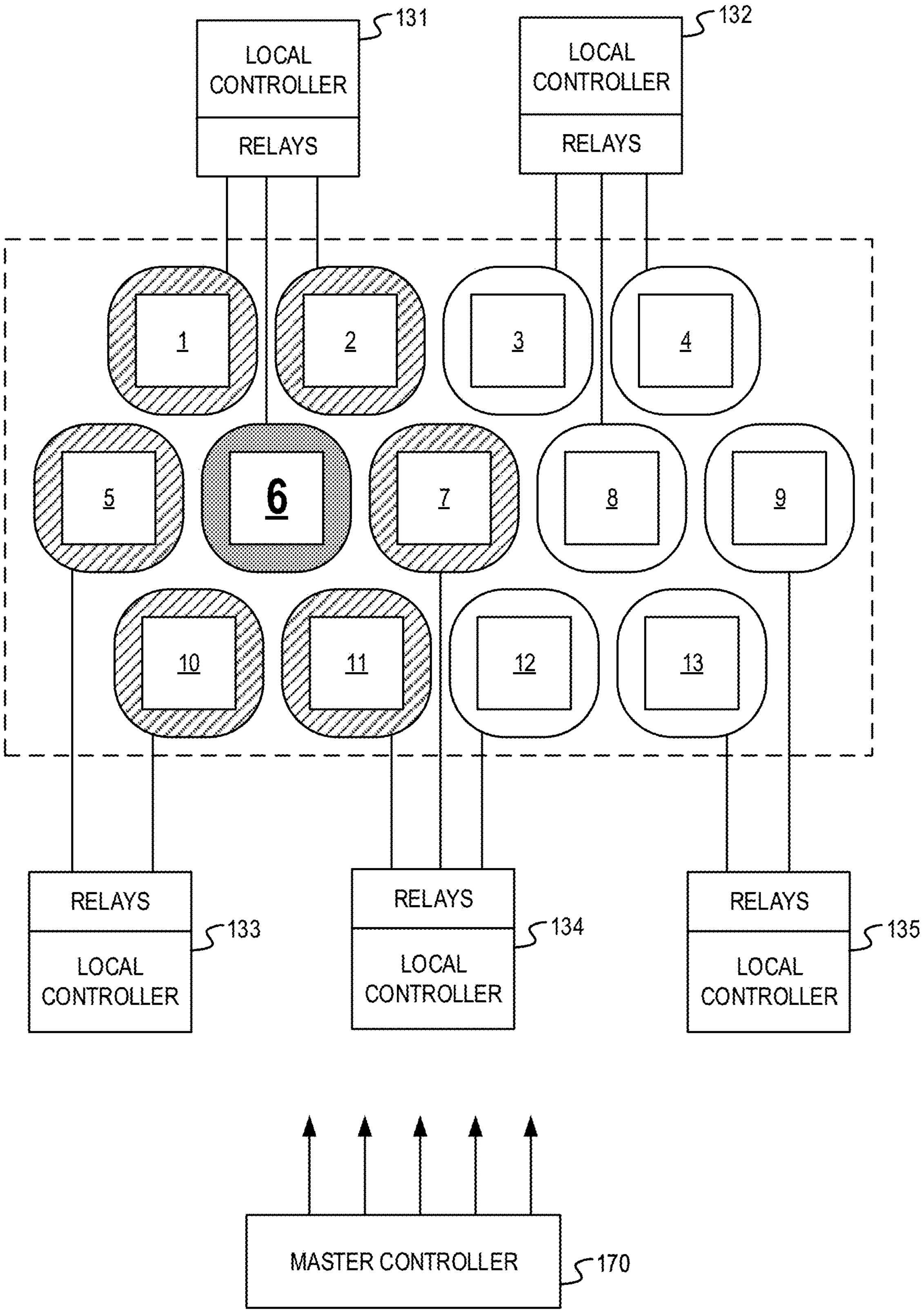
FIG. 6 shows an example of muting adjacent primary coils according to some implementations.

FIG. 6 shows an example of muting adjacent primary coils according to some implementations. In FIG. 6, the primary coil number 6 is charging a wireless power receiving apparatus (not shown). Because of the zone and relay configuration for the first zone, the other primary coils 1 and 2 in the first zone are not connected to the first local controller 131. To prevent interference to the primary coil 6, the master controller 170 may also mute the other adjacent primary coils 5, 7, 10, and 11. For example, the master controller 170 may disable the third local controller 133 altogether or may control the relays in the third zone to prevent primary coils 5 and 10 from connecting to the third local controller 133. Similarly, the master controller 170 may control the relays in the fourth zone to prevent primary coils 7 and 11 from connecting to the fourth local controller 134. Note that primary coil 12 in the fourth zone may still be used since it is not adjacent to the active primary coil 6. Therefore, the master controller 170 may control the relays in the fourth zone to connect the primary coil 12 to the fourth local controller 134. The fourth local controller 134 may periodically ping using the primary coil 12 to determine if a second wireless power receiving apparatus may be placed in that portion of the charging pad. Similarly, the other primary coils 3, 4, 8, 9, and 13 that are not adjacent to the primary coil 6 may be coupled to their respective local controllers so that they can ping to detect another wireless power receiving apparatus that can be charged by their respective local controller.

Figure 7:
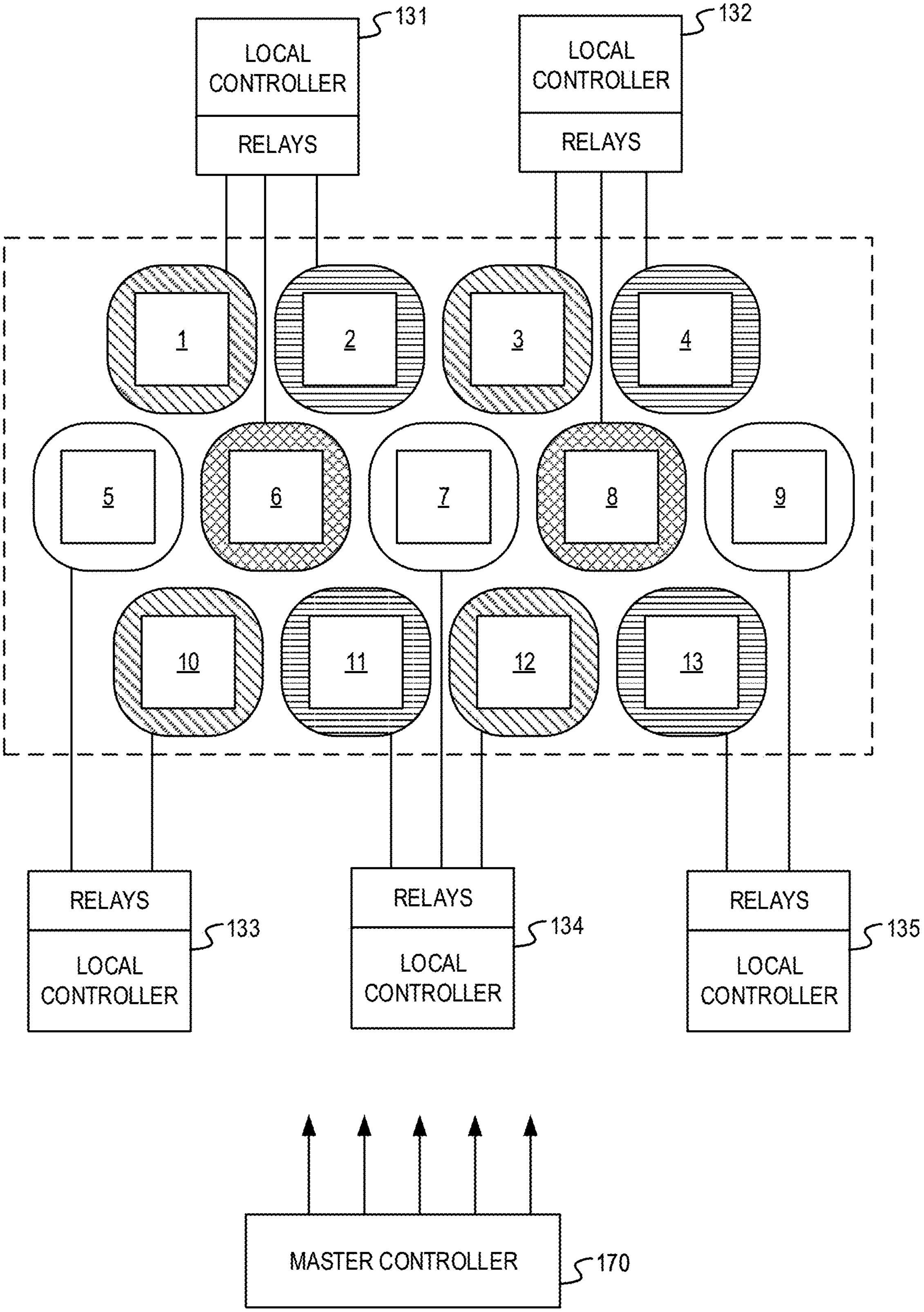
FIG. 7 shows an example pattern for digital pings managed by a master controller according to some implementations.

FIG. 7 shows an example pattern for digital pings managed by a master controller according to some implementations. The master controller 170 may control the connections of the primary coils to their respective local controllers to reduce or eliminate the number of adjacent primary coils that ping concurrently. In the example of FIG. 7, there may be four sets of coils (distributed throughout the zones) that ping at different times. The sets of coils are shown using different hatch marks for reference. Note that the example pattern in FIG. 7 is only for illustrative purposes, and the actual pattern may be different for different implementations. Furthermore, for simplicity, FIG. 7 is shown at a time where no wireless power receiving apparatus is currently placed on the charging pad and therefore all the primary coils may participate in the pinging pattern.

In the example pattern shown in FIG. 7, during a first time period, primary coils 1, 3, 10, and 12 may ping to detect for presence of a wireless power receiving apparatus while the remaining primary coils are disconnected from their respective local controllers. After the first time period, the master controller 170 may 1) disable the local controllers 131, 132, 133, 134, and 135, 2) disconnect the primary coils 1, 3, 10, and 12, 3) connect the local controllers 131, 132, 133, 134, and 135 to a different set of primary coils (primary coils 2, 4, 11, and 13), and 4) reenabling the local controllers 131, 132, 133, 134, and 135. Thus, while the first time period, primary coils 1, 3, 10, and 12 performed a ping, during the second time period, primary coils 2, 4, 11, and 13) perform a ping. The pattern is such that during each time period, no adjacent primary coil is connected to an enabled local controller. Continuing with the pattern, a third time period may include primary coils 6 and 7. A fourth time period may include primary coils 5, 7, and 9.

Figure 8:
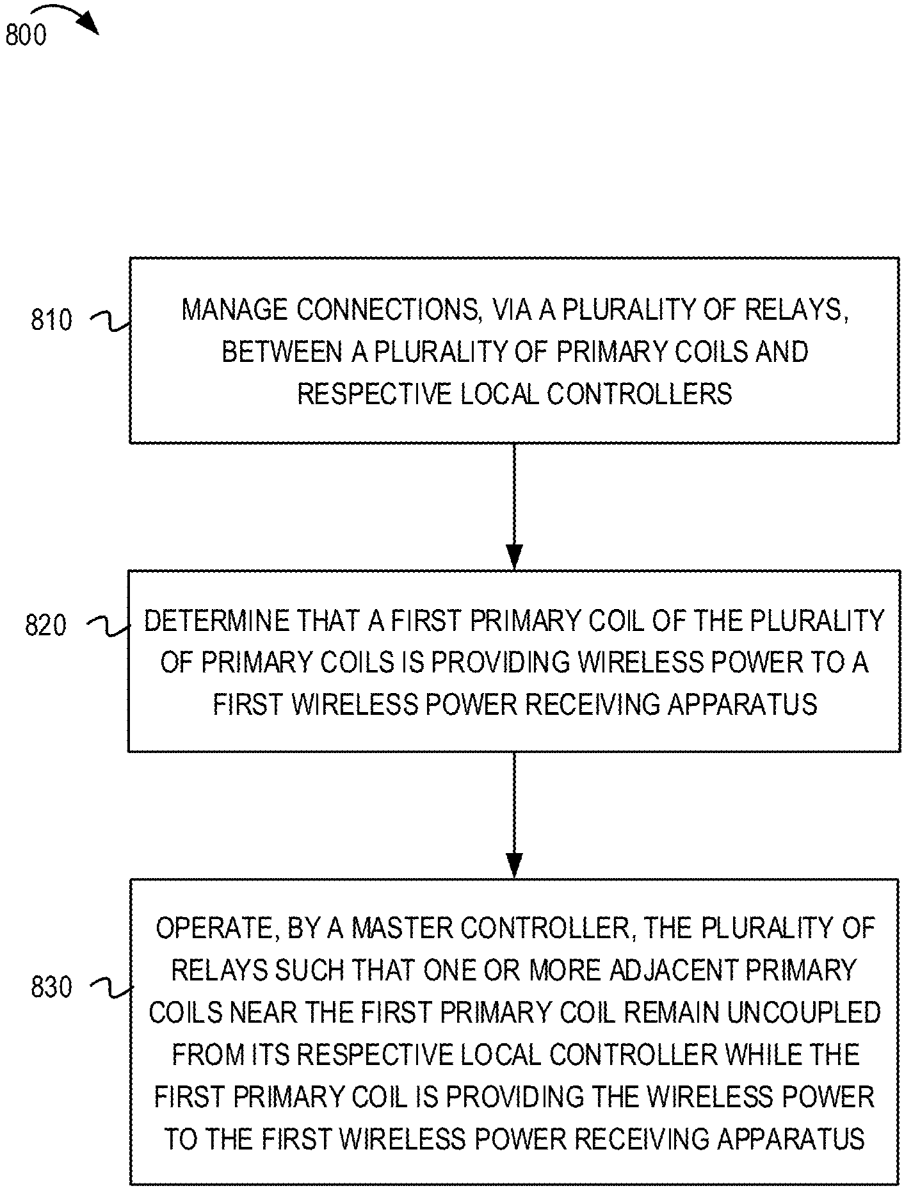
FIG. 8 shows a flowchart illustrating an example process for wireless power transmission according to some implementations.

FIG. 8 shows a flowchart illustrating an example process for wireless power transmission according to some implementations. The flowchart 800 begins at block 810. At block 810, a wireless power transmission apparatus may manage connections, via a plurality of relays, between a plurality of primary coils and respective local controllers. For example, a master controller may enable or disable the relays to change the electrical connections between a selected primary coil and a local controller of the same zone. At block 820, the wireless power transmission apparatus may determine that a first primary coil of the plurality of primary coils is providing wireless power to a first wireless power receiving apparatus. For example, the wireless power transmission apparatus may receive a status signal from the first local controller connected to the first primary coil. At block 830, the wireless power transmission apparatus may operate, by a master controller, the plurality of relays such that one or more adjacent primary coils near the first primary coil remain uncoupled from its respective local controller while the first primary coil is providing the wireless power to the first wireless power receiving apparatus. For example, the master controller may programmatically determine the adjacent primary coils and then send control signals to the relays in their zones to ensure that those adjacent primary coils are uncoupled from the local controller in the zone.

Figure 9:
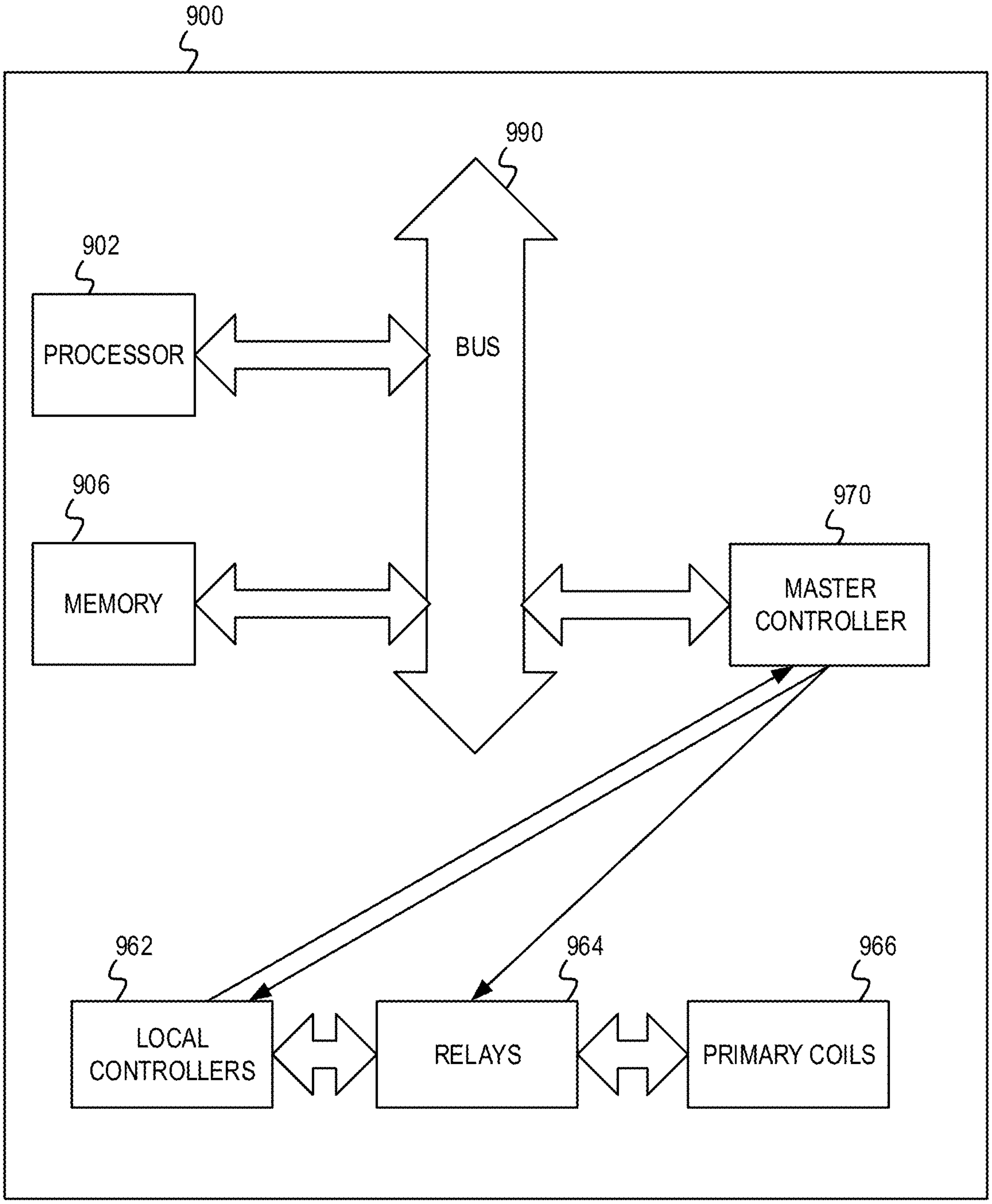
FIG. 9 shows a block diagram of an example electronic device for use in wireless power system according to some implementations.

FIG. 9 shows a block diagram of an example electronic device for use in wireless power system according to some implementations. In some implementations, the electronic device 900 may be a wireless power transmission apparatus (such as the wireless power transmission apparatus 190).

The electronic device 900 can include a processor 902 (possibly including multiple processors, multiple cores, multiple nodes, or implementing multi-threading, etc.). The electronic device 900 also can include a memory 906. The memory 906 may be system memory or any one or more of the possible realizations of computer-readable media described herein. The electronic device 900 also can include a bus 990 (such as PCI, ISA, PCI-Express, HyperTransport®, InfiniBand®, NuBus,® AHB, AXI, etc.).

The electronic device 900 may include multiple local controllers 962 configured to couple to multiple primary coils 966 via relays 964. A master controller 970 (similar to the master controller 170 described herein) may control the enabled/disablement of the local controllers 962 as well as the states of the relays 964. Furthermore, the master controller 970 may receive status signals from the local controllers 962 regarding a current charging state or wireless power receiving apparatus detection. In some implementations, the local controllers 962 can be distributed within the processor 902, the memory 906, and the bus 990. The local controllers 962 may perform some or all of the operations described herein, including those of local controllers 131, 132, 133, 134, and 135. The memory 906 can include computer instructions executable by the processor 902 to implement the functionality of the implementations described in FIGS. 1-7. Any one of these functionalities may be partially (or entirely) implemented in hardware or on the processor 902. For example, the functionality may be implemented with an application specific integrated circuit, in logic implemented in the processor 902, in a co-processor on a peripheral device or card, etc. Further, realizations may include fewer or additional components not illustrated in FIG. 9. The processor 902, the memory 906, and the local controllers 962 may be coupled to the bus 990. Although illustrated as being coupled to the bus 990, the memory 906 may be coupled to the processor 902.

FIGS. 1-9 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless power transmission apparatus, comprising:, a plurality of primary coils organized into at least a first group of primary coils and a second group of primary coils, wherein the first group of primary coils is adjacent to the second group of primary coils;

at least a first local controller associated with at least the first group of primary coils and a second local controller associated with at least the second group of primary coils;

a plurality of switches capable of individually coupling the first local controller to one or more primary coils of the first group of primary coils and individually coupling the second local controller to one or more primary coils of the second group of primary coils; and a master controller configured to:

operate the plurality of switches to control which one or more primary coils of the first group of primary coils is coupled to the first local controller and which one or more primary coils of the second group of primary coils is coupled to the second local controller, wherein a first primary coil of the first group of primary coils is coupled to the first local controller and a second primary coil of the second group of primary coils is coupled to the second local controller, wherein the first primary coil and the second primary coil are not adjacent to each other, disable, before changing a state of plurality of switches, the first local controller to prevent current from traversing from the first local controller via the plurality of switches while the state of plurality of switches are changed, and enable the first local controller after the state of the plurality of switches has changed to couple the one or more primary coils of the first group of primary coils to the first local controller.

2. The wireless power transmission apparatus of claim 1, wherein the master controller is further configured to:

determine that a first primary coil of the plurality of primary coils is providing wireless power to a first wireless power receiving apparatus; and operate the plurality of switches such that one or more adjacent primary coils near the first primary coil remain uncoupled from its respective local controller while the first primary coil is providing the wireless power to the first wireless power receiving apparatus.

3. The wireless power transmission apparatus of claim 1, wherein the plurality of switches includes:

a first set of switches configured to individually couple the first local controller to one primary coil of the first group of primary coils; and a second set of switches configured to individually couple the second local controller to one primary coil of the second group of primary coils.

4. The wireless power transmission apparatus of claim 1, further comprising:

a plurality of local controllers including at least the first local controller and the second local controller, wherein at least the first local controller includes:

a communication unit capable of receiving a communication from a first wireless power receiving apparatus via a first primary coil when the first wireless power receiving apparatus is in proximity to the first primary coil and when the first local controller is coupled to the first primary coil;

a control unit configured to manage operation of a driver in response to receiving the communication from the first wireless power receiving apparatus; and the driver configured to generate an electrical output to the first primary coil when the first primary coil is coupled to the first local controller via the plurality of switches.

5. The wireless power transmission apparatus of claim 4, wherein the first local controller is configured to:

determine a status signal to send to the master controller, wherein the status signal is based, at least in part, on the communication from the first wireless power receiving apparatus, a wireless power transfer status, the electrical output being generated to the first primary coil, a fault condition associated with charging the first wireless power receiving apparatus, or any combination thereof; and send the status signal to the master controller.

6. The wireless power transmission apparatus of claim 5, wherein the master controller is further configured to:

determine that the first primary coil is not providing wireless power to the first wireless power receiving apparatus based, at least in part, on the status signal; and operate the plurality of switches to couple the first local controller to one or more other primary coils of the first group of primary coils.

7. The wireless power transmission apparatus of claim 5, wherein the master controller is further configured to:

determine that the first primary coil is providing wireless power to the first wireless power receiving apparatus based, at least in part, on the status signal; and prevent the plurality of switches from uncoupling the first local controller from the first primary coil while the status signal indicates that the first primary coil is providing wireless power to the first wireless power receiving apparatus.

8. The wireless power transmission apparatus of claim 7, wherein the master controller is further configured to:

prevent the plurality of switches from coupling one or more adjacent primary coils near the first primary coil to its respective local controller while the status signal indicates that the first primary coil is providing the wireless power to the first wireless power receiving apparatus.

9. The wireless power transmission apparatus of claim 1, wherein the master controller is further configured to:

cause the plurality of switches to sequentially couple primary coils of the first group of primary coils to the first local controller; and or each primary coil of the first group of primary coils, receive a status signal from the first local controller, the status signal indicating whether the first local controller detects a first wireless power receiving apparatus at the primary coil that is presently coupled to the first local controller.

10. The wireless power transmission apparatus of claim 1, wherein the master controller is further configured to:

operate the plurality of switches to such that each of the plurality of primary coils are coupled to a respective local controller according to a pattern that prevents adjacent primary coils from being coupled at the same time.

11. The wireless power transmission apparatus of claim 1, wherein each group of primary coils includes at least two primary coils that can selectively be coupled to a local controller, and wherein each group of primary coils is coupled to the local controller for the group via at least one switch.

12. The wireless power transmission apparatus of claim 11, wherein the first group of primary coils includes three primary coils that can selectively be coupled to the first local controller via two relays.

13. The wireless power transmission apparatus of claim 1, further comprising:

a charging pad on which multiple wireless power receiving apparatuses may be placed, wherein the plurality of primary coils is arranged in an overlapping pattern that is distributed among multiple layers of the charging pad.

14. The wireless power transmission apparatus of claim 13, wherein at least a subset of the plurality of primary coils are constructed from graphene.

15. The wireless power transmission apparatus of claim 1, wherein the first local controller is configured cause at least a first primary coil of the first group of primary coils to transmit wireless power to a first wireless power receiving apparatus in response to a communication from the first wireless power receiving apparatus via the first primary coil when the first wireless power receiving apparatus is in proximity to the first primary coil and when the first local controller is coupled to the first primary coil; and wherein the second local controller is configured cause at least a second primary coil of the second group of primary coils to transmit wireless power to a second wireless power receiving apparatus in response to a communication from the second wireless power receiving apparatus via the second primary coil when the second wireless power receiving apparatus is in proximity to the second primary coil and when the second local controller is coupled to the second primary coil.

16. The wireless power transmission apparatus of claim 1, wherein the plurality of switches comprise relays which are remotely controlled switches managed by the master controller.

17. A method for wireless power transmission by a wireless power transmission apparatus, comprising:

managing connections, via a plurality of switches, between a plurality of primary coils and respective local controllers including at least a first local controller and a second local controller, wherein the plurality of coils includes a first group of primary coils coupled with the first local controller and a second group of primary coils adjacent the first group of primary coils and coupled with the second local controller;

determining that a first primary coil of the plurality of the first group of primary coils is providing wireless power to a first wireless power receiving apparatus;

operating, by a master controller, a state of the plurality of switches such that one or more adjacent primary coils near the first primary coil remain uncoupled from its respective local controller while the first primary coil is providing the wireless power to the first wireless power receiving apparatus;

causing the plurality of switches to concurrently couple the first primary coil of the first group of primary coils to the first local controller and couple a second primary coil of the second group of primary coils to the second local controller, wherein the first primary coil and the second primary coil are not adjacent to each other; and disabling, before changing the state of plurality of switches, the first local controller to prevent current from traversing from the first local controller via the plurality of switches while the state of plurality of switches are changed, and enabling the first local controller after the state of the plurality of switches has changed to couple one or more primary coils of plurality of primary coils to the first local controller.

18. The method of claim 17, wherein the plurality of primary coils are organized into at least the first group of primary coils that can be individually coupled to the first local controller via a first subset of the plurality of switches and the second group of primary coils that can be individually coupled to the second local controller via a second subset of the plurality of switches.

19. The method of claim 18, further comprising:

receiving, by the first local controller, a communication from the first wireless power receiving apparatus via the first primary coil when the first wireless power receiving apparatus is in proximity to the first primary coil and when the first local controller is coupled to the first primary coil; and determining, by the first local controller, a status signal to send to the master controller, wherein the status signal is based, at least in part, on the communication from the first wireless power receiving apparatus, a wireless power transfer status, an electrical output being generated to the first primary coil, a fault condition associated with charging the first wireless power receiving apparatus, or any combination thereof; and sending the status signal from the first local controller to the master controller.

20. The method of claim 19, further comprising:

determining that the first primary coil is not providing wireless power to the first wireless power receiving apparatus based, at least in part, on the status signal; and operating the plurality of switches to couple the first local controller to one or more other primary coils of the first group of primary coils.

21. The method of claim 19, further comprising:

determining, by the master controller, that the first primary coil is providing wireless power to the first wireless power receiving apparatus based, at least in part, on the status signal; and preventing, by the master controller, the plurality of switches from uncoupling the first local controller from the first primary coil while the status signal indicates that the first primary coil is providing wireless power to the first wireless power receiving apparatus.

22. The method of claim 21, further comprising:

preventing the plurality of switches from coupling one or more adjacent primary coils near the first primary coil to its respective local controller while the status signal indicates that the first primary coil is providing the wireless power to the first wireless power receiving apparatus.

23. The method of claim 17, further comprising:

causing the plurality of switches to sequentially couple primary coils of the first group of primary coils to the first local controller; and for each primary coil of the first group of primary coils, receiving a status signal from the first local controller, the status signal indicating whether the first local controller detects the first wireless power receiving apparatus at the primary coil that is presently coupled to the first local controller.

24. The method of claim 17, further comprising:

operating the plurality of switches to such that each of the plurality of primary coils are coupled to a respective local controller according to a pattern that prevents adjacent primary coils from being coupled at the same time.

* * * * *